US007430492B2

(12) United States Patent
Nicolas et al.

(10) Patent No.: US 7,430,492 B2
(45) Date of Patent: Sep. 30, 2008

(54) DEVICE AND METHOD FOR CONTROLLING THE STATE OF AN ENERGY ACCUMULATOR

(75) Inventors: Yann Nicolas, Tournefeuille (FR); Jean-Michel Pascual, Venerque (FR); Cedric Tallot, Toulouse (FR); Nicolas Dubois, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/491,772

(22) Filed: Jul. 24, 2006

(65) Prior Publication Data

US 2007/0118325 A1 May 24, 2007

(30) Foreign Application Priority Data

Jul. 25, 2005 (FR) .................................. 05 52298

(51) Int. Cl.
*G06F 15/00* (2006.01)
*G01L 19/00* (2006.01)

(52) U.S. Cl. .................. 702/176; 702/138; 303/122.12; 180/165

(58) Field of Classification Search ................. 702/114, 702/98, 100, 138, 176, 182, 187; 180/165, 180/175, 197; 303/122.1, 122.9, 122.12
See application file for complete search history.

(56) References Cited

U.S. PATENT DOCUMENTS

| | | | | |
|---|---|---|---|---|
| 5,221,125 | A | 6/1993 | Okochi et al. | 303/10 |
| 5,950,757 | A * | 9/1999 | Saita et al. | 180/404 |
| 6,132,012 | A * | 10/2000 | Ishii | 303/122.12 |
| 6,192,299 | B1 | 2/2001 | Kubota et al. | 700/282 |
| 2002/0035832 | A1 | 3/2002 | Nakamura et al. | 60/413 |
| 2002/0162381 | A1 | 11/2002 | Suzuki et al. | 73/1.17 |

FOREIGN PATENT DOCUMENTS

FR 2 815 089 A 4/2002

* cited by examiner

*Primary Examiner*—Bryan Bui
(74) *Attorney, Agent, or Firm*—Perman & Green, LLP

(57) ABSTRACT

The invention concerns a device and method for checking the state of an accumulator with energy reserve that is connected to a fluid system. According to the invention, the fluid system is first of all pressurized and this fluid is maintained at an operating pressure $P_F$ for at least a time τ so as to ensure the stabilization of this fluid system. Then the pressurisation of the fluid system is stopped and the time Δt taken by the system to pass from a predetermined pressure $P_1$ to a predetermined pressure $P_2$, with $P_2<P_1<P_F$, is determined. This period Δt is compared with a predetermined reference time $T_{ref}$.

15 Claims, 2 Drawing Sheets

"PRIOR ART"

DEVICE AND METHOD FOR CONTROLLING THE STATE OF AN ENERGY ACCUMULATOR

CROSS-REFERENCE TO RELATED APPLICATIONS

This application claims priority from French Patent Application No. 05 52298, filed on Jul. 25, 2005.

BACKGROUND

1. Field

The present invention concerns a device and method for controlling the state of an energy accumulator connected to a fluid system.

2. Brief Description of Related Developments

Aircraft are generally equipped with several hydraulic circuits, a main one and at least one auxiliary one, independent and self contained, which permit the actuation of all the aircraft equipment. FIG. 1 depicts schematically such a hydraulic circuit for controlling a flap 1. This closed hydraulic circuit has a fluid reservoir 2 connected by a distribution circuit 3 to a hydraulic actuator 4. Such a distribution circuit 3 comprises rigid pipes and possibly flexible pipes for the mobile connections (brakes, landing gear, etc). The generation of hydraulic power is provided for example by a variable-output piston pump 5.

When the pilot acts on a control 6 such as a joystick, a control signal is sent to a computer 7 that controls a selector 8. In FIG. 1, the selector 8 is in the "retracted" position. One face of this actuator 4 receives the hydraulic pressure in an inlet chamber 9 causing a movement of the actuator towards the right. The flap 1 then moves downwards. The outlet chamber 10 of this actuator being connected in return to the reservoir 2, the fluid present in this chamber 10 is sent to the reservoir 2. A transmitter 11 sends a status signal for the flap 1 to the computer 7 for display 12. Naturally, the selector 8 can send the fluid under high pressure to the chamber 9 or to the chamber 10 according to the required direction of movement of the flap 1, downwards or upwards.

It is known that, in order to function effectively, the consumers 4 need a constant nominal pressure in the chambers 9 or 10 according to the manoeuvre to be performed. Rapid manoeuvres then make the nominal pressure drop transiently since the hydraulic pumps are no longer in a position to ensure the maintenance of this pressure, particularly if the consumers 4 are situated far from this pressure source. The fluid entering the inlet chamber 9 must in fact be under nominal pressure in order to make the flap 1 move in an optimum fashion. The fluid at low pressure being in the outlet chamber 10 returns via a low-pressure hydraulic line BP to the reservoir 2. It is this difference in pressure between the inlet 9 and outlet 10 chambers that actuate the flap 1.

An accumulator with an energy reserve 13 is then used, which will restore its hydraulic energy reserve to the consumer or consumers 4 in order to maintain the pressure at a level close to the nominal operating pressure. This accumulator with energy reserve 13 is placed on the high-pressure hydraulic line HP between the hydraulic power generator 5 and the consumers 4 furthest away from this power generator 5.

This accumulator 13 also makes it possible to absorb the overpressures generated in the hydraulic circuit by the functioning of the consumers 4. Damage to structure and equipment of the aircraft during an abrupt variation in pressure in the pipework is thus avoided.

An accumulator with energy reserve 13 comprises two cavities 14, 15 (FIG. 2). A first cavity 14 connected to a hydraulic circuit, and a second cavity 15 in which a gas is trapped under pressure. An elastic wall can be used to delimit these two volumes 14, 15. However, this elastic wall can lose efficacy through a prolonged contact with the fluid, the pressurised gas in the second cavity 15 then migrating in the fluid for example.

The correct functioning of this accumulator with energy reserve 13 is guaranteed only when the accumulator is correctly pressurised, it is necessary to regularly check the pressure of the gas present in the second cavity 15.

This operation is performed by a maintenance operator by means of a pressure gauge 16 for each of the hydraulic circuits of the aircraft. The immobilisation of aircraft on the ground, and the need to employ skilled personnel to perform these maintenance operations, gives rise to a significant cost for the airline.

Skilled operators are in fact necessary since, the pressure varying with temperature, erroneous pressure reading interpretations could arise.

In addition, these accumulators, which are placed inside the apparatus, require the use of supplementary means for transferring the point for reading the pressure of the gas present in the second cavity to a maintenance point situated on the external structure of the aircraft. This pipework, these pressure gauges and all the fixing means have an impact on the weight of the aircraft and therefore on its fuel consumption, and moreover impair the reliability of the accumulator with energy reserve and therefore of the hydraulic system on which the accumulator is mounted.

The objective of the present invention is therefore to propose a device and method for checking the pressurisation of an energy accumulator connected to a fluid system, simple in their design and in their operating method, economical and allowing particularly reliable, precise and automatic checking of the state of pressurisation of an energy accumulator.

SUMMARY

To this end, the invention concerns a method of checking the state of an accumulator with energy reserve that is connected to a fluid system. According to the invention, the following successive steps are performed:

- the fluid system is pressurised,
- this fluid is maintained at an operating pressure $P_F$ for at least a time $\tau$ so as to ensure the stabilisation of the fluid system,
- the pressurisation of the fluid system is stopped,
- the time $\Delta t$ taken by this system to change from a predetermined pressure $P_1$ to a predetermined pressure $P_2$, with $P_2<P_1<P_F$, is determined,
- this time $\Delta t$ is compared with a predetermined reference time $T_{ref}$.

In various particular embodiments of the method for checking the state of an accumulator, each having its particular advantages and capable of many possible technical combinations:

- the pressure $P_2$ is the pre-charging pressure of the accumulator,

"Pre-charging pressure" means here the pressure of the gas in the second cavity of a new accumulator with energy reserve, that is to say the pressure as specified on leaving the factory. This optimum pre-charging pressure is typically between 180 and 220 bar depending on the gas contained in the second cavity.

- the pressure $P_1$ is such that $\frac{1}{10} P_F<P_1<P_F$,

Preferably, and for more precision in the measurement, it will nevertheless be ensured that the interval of time $\Delta t$ separating two predetermined pressure measurements $P_1$ and $P_2$ is as large as possible, that is to say the predetermined pressure $P_1$ is as close as possible to $P_F$.

the reference time $T_{ref}$ is determined by steps a) to d) using a reference accumulator.

The invention also concerns a device specially adapted for implementing the method described above. This device comprises an accumulator with energy reserve connected to a high-pressure line of a fluid system. The fluid system comprises at least one pump for pressurising the system.

According to the invention, the device comprises:

a real-time processing unit having a non-volatile memory, at least one pressure detector for measuring the pressure of the fluid in the high-pressure line, the detector sending to the processing unit a measurement signal representing the pressure measured by this detector, and the processing unit comprises electronic means for measuring the interval of time $\Delta t$ separating two predetermined pressure measurements $P_1$ and $P_2$, and means for comparing this value $\Delta t$ with a reference value stored in the non-volatile memory.

In various embodiments, the present invention also concerns the following characteristics that are to be considered in isolation or in accordance with all their technically possible combinations:

the pressure detector is mounted on the high-pressure hydraulic line of the fluid system where the accumulator with energy reserve is mounted, the processing unit sends a state signal from the accumulator to display means.

This state signal informs the operator, the pilot of the aircraft for example, whether the check test carried out is positive or negative, that is to say whether or not the pressure of the gas in the second volume of the accumulator is sufficient. A negative test requires the accumulator with energy reserve to be changed. These display means can be connected to an audible alarm.

The device and method for checking the pressurisation of an energy reserve accumulator can advantageously be used for aircraft or boat fluid systems.

DESCRIPTION OF THE DRAWINGS

The invention will be described in more detail with reference to the accompanying drawings, in which:

FIG. 3 shows a device for checking the state of an accumulator with energy reserve according to a particular embodiment of the invention.

DESCRIPTION OF THE DISCLOSED EMBODIMENTS

Figure 1:
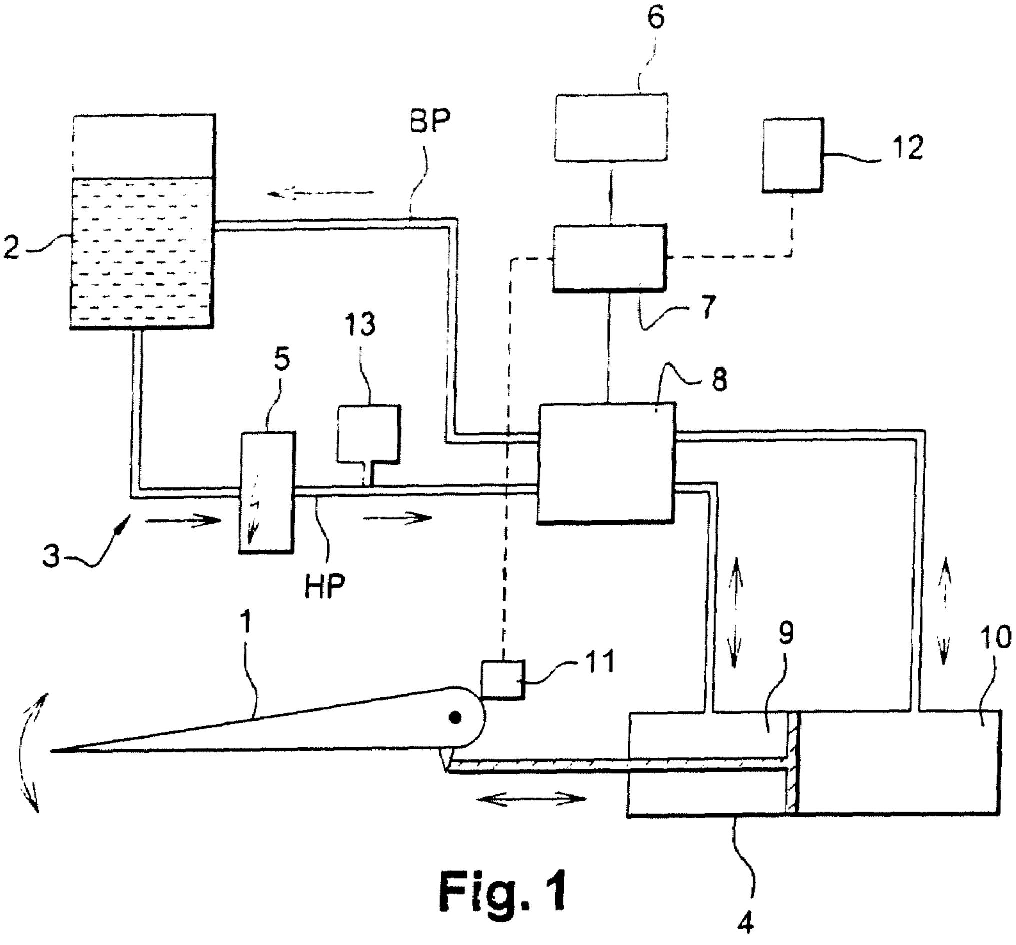
FIG. 1 is a schematic representation of a fluid system controlling the movement of a flap of the prior art.
Figure 2:
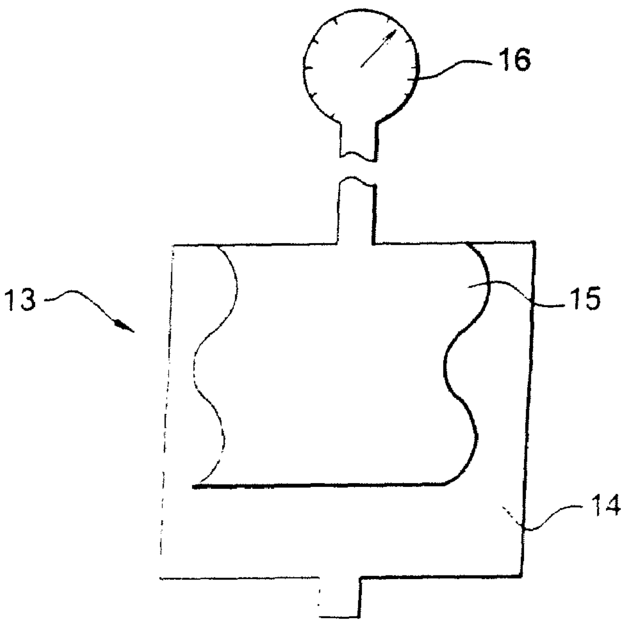
FIG. 2 is a schematic representation of the means of the prior art for checking the pre-charging pressure of an accumulator with energy reserve using a pressure detector with visual display.

The accumulator with energy reserve is connected to a fluid system. Each aircraft comprises at least one main fluid system and at least one back-up fluid system for manoeuvring all the aircraft equipment. The back-up fluid system provides redundancy for all the vital functions of the aircraft. Each fluid system has its own fluid reservoir 17 connected to a closed fluid distribution circuit 18, which comprises a high-pressure line HP and a low-pressure line BP for the return of the fluid at low pressure to the reservoir 17. The fluid used is a non-compressible liquid for an aircraft but any other liquid or air can be used for applications other than aeronautical (land or naval).

Each fluid system comprises at least one accumulator with energy reserve 19, the number being a function of the demands of the equipment for fluid under nominal pressure. The device of the invention described below in the context of checking the state of an accumulator connected to a fluid system can be adapted by a person skilled in the art to check all the accumulators in the fluid system.

The accumulator with energy reserve 19 is here a hydraulic accumulator with metal bellows. In a variant, it is a membrane accumulator, that is to say one comprising an elastic wall delimiting the internal volume of this accumulator in two cavities.

On this distribution circuit 18 there is placed at least one pump 20 for pressurising the system. This pressurisation pump 20 is either a constant-pressure pump or a constant-power pump. For applications in the aeronautical field, it is a piston pump in both cases.

The accumulator with energy reserve 19 is mounted on the high-pressure line HP of the fluid system 18 between the pressurisation pump 20 of the system and the consumers 4.

The device comprises a pressure detector 21 for measuring the pressure of the fluid in the high-pressure HP of this fluid system. This pressure detector 21 is mounted on the distribution circuit 18 on the same high-pressure line HP where the accumulator with energy reserve 19 to be tested is placed. It emits a measurement signal representing the pressure measured by the detector to a real-time processing unit 22 having a non-volatile memory 23.

This pressure detector 21 advantageously makes it possible to measure pressures ranging up to 420 bar with a precision on the measurement of less than ±4 bar. The pressure detector 21 must have a very rapid measurement acquisition speed in order to be able to respond to discharge times of much less than one second.

The real-time processing unit 22 is for example an onboard computer. It comprises electronic means 24 for measuring the interval of time $\Delta T$ separating two predetermined pressure measurements $P_1$ and $P_2$ by the pressure detector 21. It also comprises means 25 for comparing this value $\Delta T$ with a reference value stored in the non-volatile memory 23. These means are known to persons skilled in the art and will not be described here. They may comprise by way of illustration an acquisition card mounted on the onboard computer 22 and software for comparing the interval of time measured with the reference value stored in the non-volatile memory 23.

The state of an accumulator 19 can be checked in non real-time whenever the pump nominally pressurises the fluid system in a stabilised fashion and then stops. This check can thus take place for example after a manoeuvre of the cargo door by maintaining the generation of pressure for the length of time necessary for the test or after a manoeuvre of a consumer 4 using a secondary power generation from a local fluid system. The processing unit in a pre-programmed manner initiates the procedure of comparing the interval of time $\Delta T$ separating two predetermined pressure measurements $P_1$ and $P_2$ with the reference time $T_{REF}$.

Advantageously, the pressure $P_2$ is the pre-charging pressure of the accumulator and the pressure $P_1$ is such that $1/10\ P_F<P_1<P_F$. This value of the pressure $P_1$ is however given by way of indication since, for more precision in the measurement, it would preferably be ensured that this interval of time $\Delta T$ separating two predetermined pressure measurements $P_1$ and $P_2$ is as large as possible, that is to say the predetermined pressure $P_1$ is as close as possible to $P_F$. The gas pre-charging pressure HE of this accumulator with metal bellows is, by way of example, 180 bar.

The real-time processing unit 22 can send a state signal from the accumulator with energy reserve 19 to display means indicating to the operator whether a maintenance operation is to be performed on this accumulator 19.

The invention also concerns an aircraft comprising at least an accumulator with energy reserve connected to a fluid system, this aircraft comprising a device for checking the state of an accumulator with energy reserve as described previously.

Finally, the invention concerns a method of checking the state of an accumulator with energy reserve 19, this accumulator being connected to a fluid system.

This fluid system is first of all pressurised. For this purpose, at least one pressurisation pump 20 as described above is used. This fluid is maintained at an operating pressure $P_F$, for example 350 bar, for at least a time $\tau$ so as to ensure the stabilisation of the fluid system. The stabilisation of the system is achieved when no more variation in pressure and temperature is observed in the fluid system.

The pressurisation of the fluid system is then stopped and the way in which the system falls in pressure is determined. The gas pressure in the second cavity of the accumulator with energy reserve 19 is then derived from an analysis of the pressure discharge time $\Delta T$ of the fluid system.

For this purpose, the time $\Delta T$ taken by the system for passing from a predetermined pressure $P_1$ to a predetermined pressure $P_2$, with $P_2<P_1<P_F$, is determined. Advantageously, the pressure $P_2$ is the pre-charging pressure of the accumulator and the pressure $P_1$ is such that $1/10\ P_F<P_1<P_F$. If the accumulator is pressurised at the correct pressure, the discharge time of the system $\Delta T$ is greater than or equal to a predetermined reference time $T_{REF}$. On the other hand, if the accumulator with energy reserve 19 is discharged and maintenance work is necessary, for example a re-pressurisation of the accumulator or replacement with a new accumulator, then this discharge time $\Delta T$ is appreciably less than the predetermined reference time $T_{REF}$. Advantageously, a processing unit 22 sends a state signal from this accumulator 19 to display means placed on an individual control panel for this fluid system.

This reference time $T_{ref}$ is for example previously determined by means of a reference accumulator, that is to say a correctly pressurised accumulator. The value of this reference time $T_{ref}$ is preferentially stored in a non-volatile memory 23 of a real-time processing unit 22 receiving the measurement signals representing the pressure measured by at least one pressure detector 21 mounted on the high-pressure line HP of the fluid system.

Figure 3:
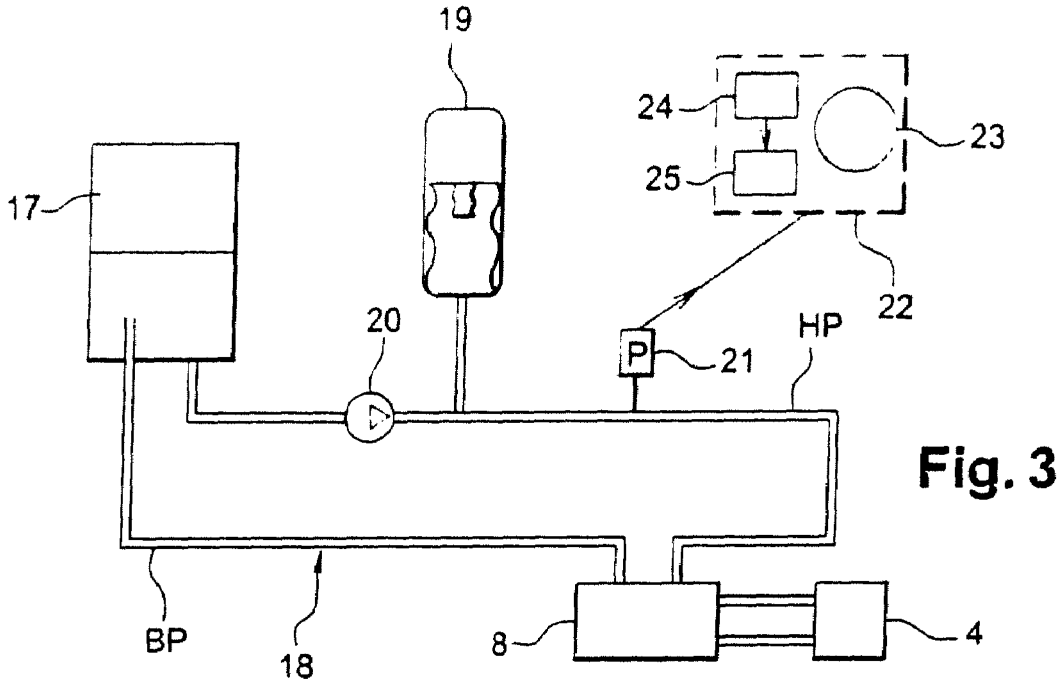
FIG. 3 shows schematically a device for checking the state of an accumulator with energy reserve according to a particular embodiment of the invention.
Figure 4:
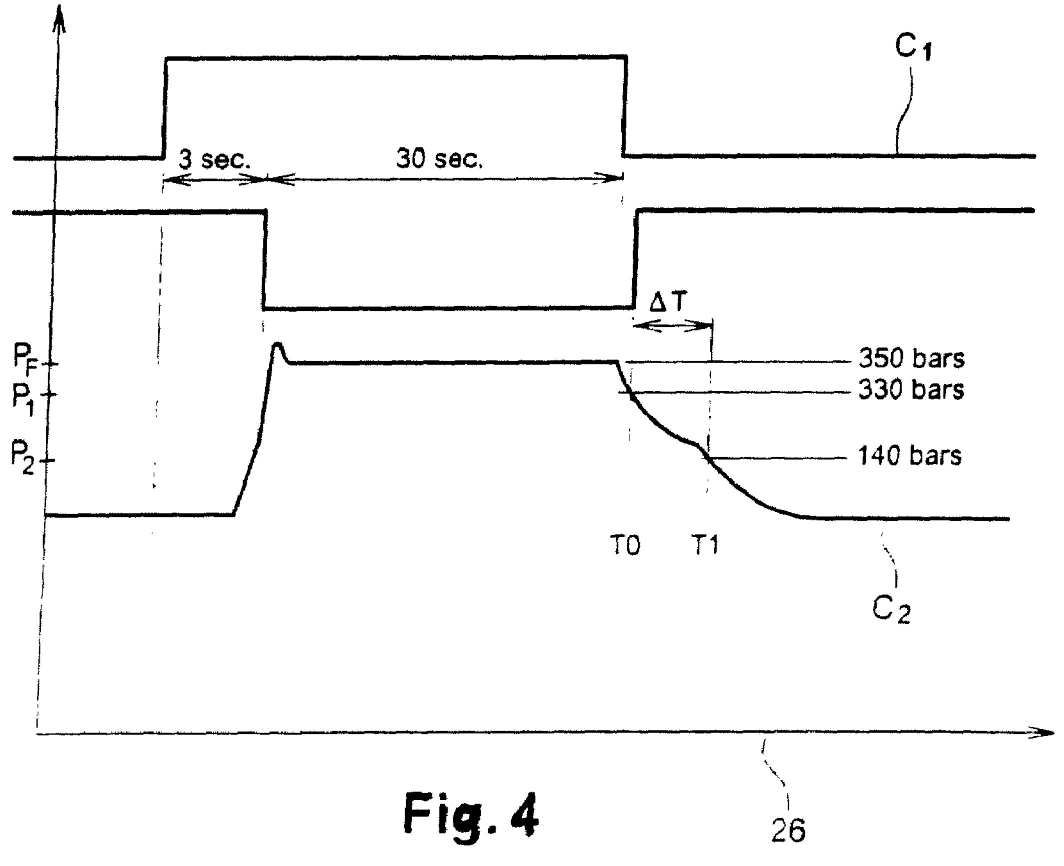
FIG. 4 is a schematic representation of a test of an accumulator with energy reserve according to a particular embodiment of the method of the invention.

FIG. 4 shows a method of implementing the method of the invention with the device in FIG. 3. The X-axis 26 represents the time axis. Curve $C_1$ shows the signal energising the pressurisation pump 20 of the fluid system, the maintenance of this pump 20 and its stoppage after an operating time of 33 seconds. Curve $C_2$ represents the pressure measurements of the fluid system obtained by the pressure detector 21. The time for stabilising the fluid system is 30 seconds.

The time $\Delta T$ taken by the fluid system for passing from a predetermined pressure $P_1$ of 330 bar to a predetermined pressure of $P_2$ of 140 bar is 3 seconds. This discharge time of the fluid system is appreciably greater than the reference time $T_{ref}$=1 second determined with a reference accumulator with energy reserve. A comparison of these times indicates that the accumulator 19 is correctly pre-charged and requires no maintenance work.

What is claimed is:

1. A method of checking a state of an accumulator with energy reserve that is connected to a fluid system, the method comprising;

pressurizing the fluid system to an operating pressure $P_F$;

maintaining the fluid system at the operating pressure $P_F$ for at least a period of time $\tau$ to ensure a stabilization of the fluid system;

stopping the pressurisation of the fluid system after an expiration of the at least time period $\tau$;

detecting that a pressure value of the fluid system falls from the operating pressure $P_F$ to a predetermined pressure value $P_1$;

initiating a checking process to determine a time $\Delta t$ taken by the system to change from the detected predetermined pressure $P_1$ to a predetermined pressure $P_2$, wherein $P_2<P_1<P_F$;

comparing the time $\Delta t$ with a predetermined reference time $T_{ref}$ wherein the state of the accumulator is determined by a result of the comparison of time $\Delta t$ with predetermined reference time $T_{ref}$.

2. A method according to claim 1, further comprising comparing the time $\Delta t$ with the predetermined reference time $T_{ref}$ using a real-time processing unit, the reference time $T_{ref}$ being stored in a non-volatile memory of the processing unit.

3. A method according to claim 2, further comprising, after comparing the time $\Delta t$ with the predetermined reference time $T_{ref}$, sending a state signal from the processing to a display unit to indicate the status of the accumulator.

4. A method according to claim 1, further comprising that the reference time $T_{ref}$ is pre-determined using a reference accumulator.

5. A method according to claim 1, further comprising that the pre-determined pressure value $P_2$ is a pre-charging pressure of the accumulator.

6. A method according to claim 1, further comprising that the pre-determined pressure value $P_1$ is $1/10\ P_F<P_1<P_F$.

7. A method according to claim 1, further comprising that the fluid is air.

8. A method according to claim 1, further comprising that the fluid is a liquid.

9. The method of claim 1 further comprising that the state of the accumulator indicates a need for maintenance when the time $\Delta t$ is less than the predetermined reference time $T_{ref}$.

10. The method of claim 1 further comprising that the state of the accumulator indicates the accumulator is properly charged when the time $\Delta t$ is greater than the predetermined reference time $T_{ref}$.

11. The method of claim 1 wherein the time $\Delta t$ is a pressure discharge time for the fluid system to go from predetermined pressure $P_1$ to predetermined pressure $P_2$.

12. A device for determining a state of an accumulator with energy reserve, the accumulator connected to a high-pressure line (HP) of a fluid system, the fluid system comprising at least one pump for pressuring the system, the device comprising:

a real-time processing unit having a non-volatile memory, at least one pressure detector for measuring a pressure of a fluid in the high-pressure line (HP), the detector configured to send to the processing unit a measurement signal representing a pressure measured by the detector, wherein the processing unit comprises electronic means for measuring an interval of time Δt separating two predetermined pressure measurements $P_1$ and $P_2$, and means for comparing the time interval Δt with a reference value stored in the non-volatile memory in order to determine the state of the accumulator.

13. A device according to claim 12, wherein the pressure detector measures pressures ranging up to 420 bar.

14. A device according to claim 12, wherein the real-time unit is configured to send a signal identifying a state of the accumulator to a display means.

15. An aircraft comprising at least one accumulator with energy reserve the aircraft comprising at least one device according to claim 12.

* * * * *